(12) United States Patent
Page

(10) Patent No.: US 11,715,149 B2
(45) Date of Patent: Aug. 1, 2023

(54) COMMERCE SYSTEMS HAVING INTEGRATED ELECTRONIC DELIVERY FEATURES

(71) Applicant: RocketFuel Blockchain, Inc., Beverly Hills, CA (US)

(72) Inventor: Joseph E. Page, La Jolla, CA (US)

(73) Assignee: RocketFuel Blockchain, Inc., Beverly Hills, CA (US)

( * ) Notice: Subject to any disclaimer, the term of this patent is extended or adjusted under 35 U.S.C. 154(b) by 231 days.

(21) Appl. No.: 16/877,251

(22) Filed: May 18, 2020

(65) Prior Publication Data

US 2021/0358018 A1 Nov. 18, 2021

(51) Int. Cl.
| | |
|---|---|
| *G06Q 30/00* | (2012.01) |
| *G06Q 30/0601* | (2023.01) |
| *G06Q 20/12* | (2012.01) |
| *G06Q 20/22* | (2012.01) |
| *H04L 9/06* | (2006.01) |
| *G06Q 20/36* | (2012.01) |

(52) U.S. Cl.
CPC ..... *G06Q 30/0637* (2013.01); *G06Q 20/1235* (2013.01); *G06Q 20/223* (2013.01); *G06Q 20/3678* (2013.01); *H04L 9/0637* (2013.01)

(58) Field of Classification Search
CPC .................................................. G06Q 30/0637
USPC .......................................................... 705/26
See application file for complete search history.

(56) References Cited

U.S. PATENT DOCUMENTS

| | | | |
|---|---|---|---|
| 9,911,134 B2 | 3/2018 | Gupta et al. | |
| 10,510,053 B2 | 12/2019 | Armstrong | |
| 2014/0222624 A1* | 8/2014 | Custer | G06Q 30/0637 |
| | | | 705/26.82 |
| 2015/0332395 A1 | 11/2015 | Walker et al. | |
| 2016/0012465 A1* | 1/2016 | Sharp | G06Q 20/321 |
| | | | 705/14.17 |
| 2017/0308872 A1 | 10/2017 | Uhr et al. | |
| 2018/0060835 A1* | 3/2018 | Martin | H04L 9/0637 |
| 2019/0311353 A1* | 10/2019 | Solis | G06F 21/64 |

(Continued)

FOREIGN PATENT DOCUMENTS

KR         10-2052911 B1      1/2020

OTHER PUBLICATIONS

VSK Chains: Integrated Content and Currency Transaction Blockchains C. E. Veni Madhavan, Ch. Srikanth, and H.V. Kumar Swamy (Year: 2017).*

(Continued)

*Primary Examiner* — Bruce I Ebersman
*Assistant Examiner* — John A Anderson
(74) *Attorney, Agent, or Firm* — Dinsmore & Shohl LLP

(57) ABSTRACT

A method includes conveying a cryptocurrency transaction to a peer-to-peer network, wherein said cryptocurrency transaction having encoded therein an email address and to convey goods or services embodied in an electronic form to the email address in response to receipt of said cryptocurrency transaction on said peer-to-peer network. The conveying of goods or services includes transmitting over the Internet in conformance with an email protocol. The goods or services includes event admission tickets, music recordings, video, text, game content, live event broadcast, software, encryption keys or passwords.

20 Claims, 5 Drawing Sheets

(56) References Cited

U.S. PATENT DOCUMENTS

2020/0117690 A1* 4/2020 Tran .................. G06F 16/90332

OTHER PUBLICATIONS

A Solution for Secure Certified Electronic Mail Using Blockchain as a Secure Message Board M. Francisca Hinarejos , Josep-Lluis Ferrer-Gomila , and Llorenç Huguet-Rotger (Year: 2019).*
International Search Report and Written Opinion for PCT Application No. PCT/US2021/032802, dated Sep. 8, 2021, 5 pages.

* cited by examiner

COMMERCE SYSTEMS HAVING INTEGRATED ELECTRONIC DELIVERY FEATURES

BACKGROUND OF THE INVENTION

Field

The following invention disclosure is generally concerned with cryptography, based currencies and commerce systems and specifically concerned with commerce systems adapted for cryptocurrency use in which cryptocurrency transactions include a delivery address specification.

Related System

The Controversially famous Amazon 'single-click' invention presented in U.S. Pat. No. 5,960,411, surviving a rigorous 4 year re-examination 90/007,946 to emerge largely unscathed, remains a very, powerful concept in e-commerce. The patent will remain in force until September 2017 providing Amazon a very enviable advantage in the e-commerce arena.

In brief, an Amazon customer prepares a profile that includes credit card account details and shipping address. Thereafter, whilst browsing an Amazon Shopping website a so-prepared customer can avoid tedious check out/shopping cart processes by using a 'single click' checkout function. One click on the appropriate command button informs Amazon of their known customer's decision to buy a product; further authorizes charges to the credit card on file; and finally specifies the delivery address similarly by way of the customer's prepared profile details to a fulfillment center.

Amazon is not alone in their efforts to make shopping easy for customers with particular regard to the checkout process. EBay® operates an instant 'buy it now' feature which similarly permits a customer to skip an auction bidding process and invoke an instant sale transaction. Payment and shipping details follow immediately after a website user exercises the 'bay it now' feature.

The PayPal component of eBay also permits storage of a delivery address whereby a known customer can avoid repeatedly entering shipping details as that information may be recalled from a customer profile maintained in memory registers.

However when not using either of these advanced commerce sites, e-commerce consumers generally have to endure a tedious checkout process in which one must manually enter credit card details and further shipping information. Because each among us has performed this repeatedly over the years, nearly everyone sighs the very sight of another checkout website with its long form full of data fields which we have filled out so many times before. Accordingly there is a very long felt need for a checkout page which permits users to indicate approval via a single click and all payment and shipping information is automatically conveyed to merchants.

The systems presented herein are no less than spectacular because they are merchant agnostic. The system works for all merchants and it is not necessary for customers to be pre-registered as a noun (previous) customer of the merchant. Rather, completely unknown, unsubscribed customers equally enjoy this functionality at all merchants site which elect to operate merely by examining cryptocurrency transactions for shipping preference information and executing fulfillment based thereon.

A new and interesting system based upon distributed cryptography includes a cryptocurrency known as 'Bitcoin'. While primarily a currency, Bitcoin additionally includes many important features which are fairly characterized as entire payment transactional systems. The Bitcoin peer-to-peer network has quickly risen up to become far more than mere currency. While still quite in its infancy, supporting systems which integrate with the remarkable features of Bitcoin come forth daily and probably will continue for some time into the future.

While systems and inventions of the art are designed to achieve particular goals and objectives, some of those being no less than remarkable, these inventions of the art have nevertheless include limitations which prevent uses in new ways now possible. Inventions of the art are not used and cannot be used to realize advantages and objectives of the teachings presented herefollowing.

SUMMARY OF THE INVENTION

Comes now, Jos. E. Page with inventions of commerce systems having integrated electronic delivery features including apparatus methods, and articles of manufacture for effecting cryptocurrency payment transactions with included delivery address specification.

Cryptocurrency systems including Bitcoin offer astounding new possibilities and enable remarkably novel functionality. In systems first presented herefollowing, cryptocurrency clients are arranged with prescribed delivery address specification for receipt of electronically conveyed goods and services. Cryptocurrency payments made via this so prepared client cause special cryptocurrency transactions to be formed and passed into peer-to-peer cryptocurrency networks.

Once received by the peer-to-peer network and queued for processing on the blockchain, a merchant can parse these special transactions to decrypt delivery information such as a customer email address. Electronic goods and services such as concert tickets software, music, et cetera may then be transmitted directly and instantly to the customer.

Cryptocurrency transactions taught here are quite unique because they carry both payment and shipping/delivery information. Because customer specified delivery information (i.e. email address) may be maintained in a user profile of a cryptocurrency client, it is no longer necessary for users to manually convey this information to vendors. Rather, a single-click Bitcoin payment for example includes the email address on which the customer prefers to receive electronic delivery of goods and services.

Users install a special-purpose Bitcoin client on their choice of computing platform. Such Bitcoin client is unique in that it provides for a user profile facility in which one may set default shipping information including email address postal address, shipping options, et cetera.

Once initiated with default shipping information, Bitcoin clients operate normally and appear identically with respect to common Bitcoin clients. However, important 'behind-the-scenes' activity is additionally taking place when transactions are formed in accordance with these teachings. Whenever the Bitcoin client is used to make purchases from cooperating merchants, special Bitcoin transactions are formed by the client, transactions in which a customer email address is included.

Because merchants can readily detect Bitcoin transaction made in this manner as they arrive on the blockchain, highly automated quick electronic delivery of goods and services is possible. For example, after the first confirmation a merchant might automatically deliver goods to the so specified customer email for example concert tickets.

Because the certainty of the payment is very high and the blockchain data is well secured, a vendor can be sure he is dispatching goods to the correct person. Further, as the blockchain is easy to monitor and parsed by machine, electronic fulfillment of goods and service delivery can be fully automated.

Customers interested in making purchases may scan a single QR code with their mobile phone to invoke a Bitcoin client prepared with a Bitcoin balance and prescribed user profile information. A single-click confirmation causes the Bitcoin client to properly form a Bitcoin transaction to pay the merchant the correct amount in cryptocurrency unit and further to specify a receiving address or email on which goods and services are to be received.

Merchant's fulfillment centers detect these payments, verify confirmation on the blockchain, and dispatch goods to the email addresses specified directly in the Bitcoin transaction as recorded in the blockchain Objectives of the Invention It is a primary object of the inventions to provide new cryptocurrency based commerce systems with integrated delivery schemes.

It is an object of the inventions to provide cryptocurrency payments systems having transactions with email delivery address specifications integrated therein.

It is a further object to provide commerce systems including merchant delivery routing information for conveying electronic goods and services.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, hut do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

DETAILED DESCRIPTION AND PREFERRED EMBODIMENTS

Figure 1:
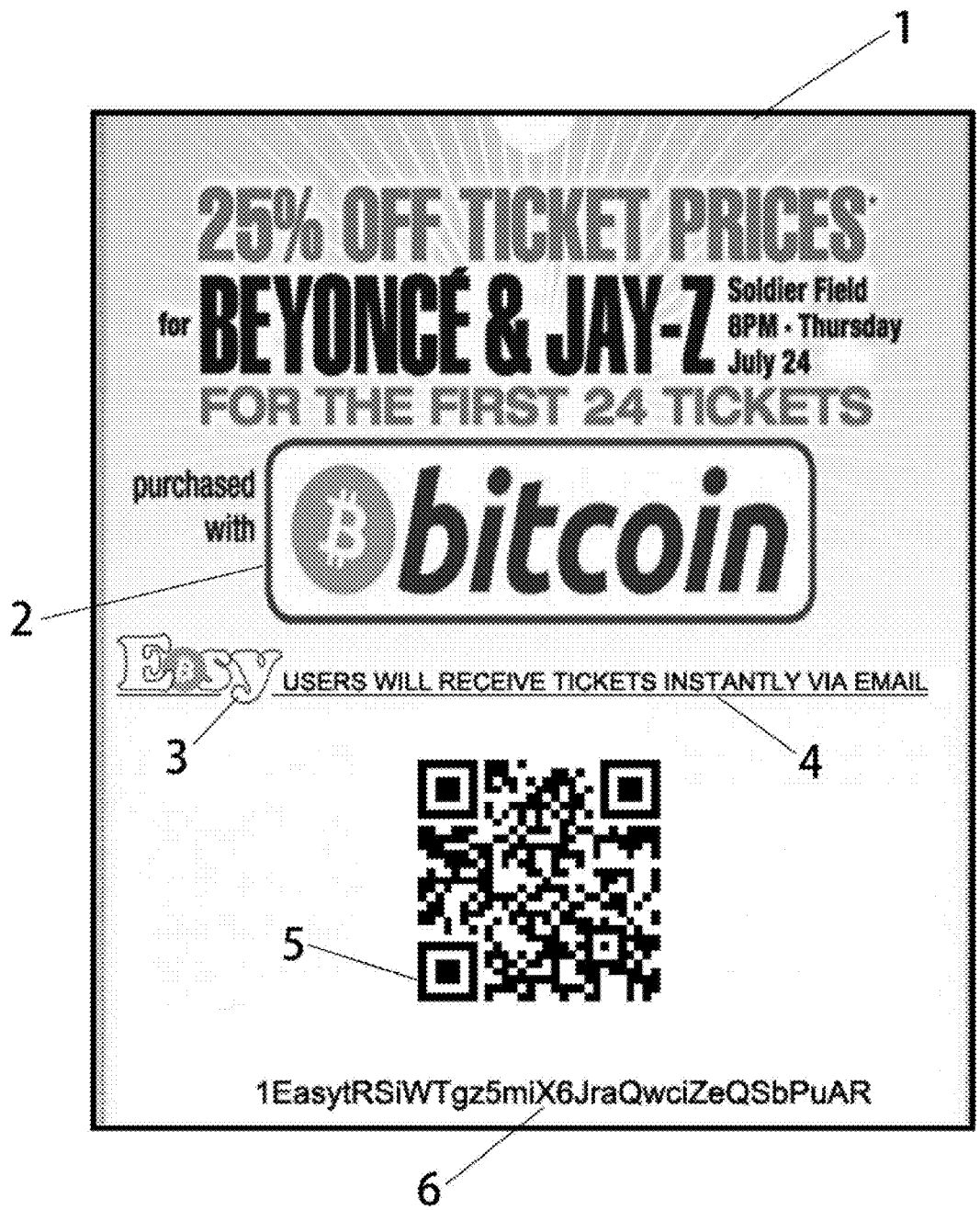
FIG. 1 is an illustrative version of a product advertisement portion of these commerce systems.
Figure 2:
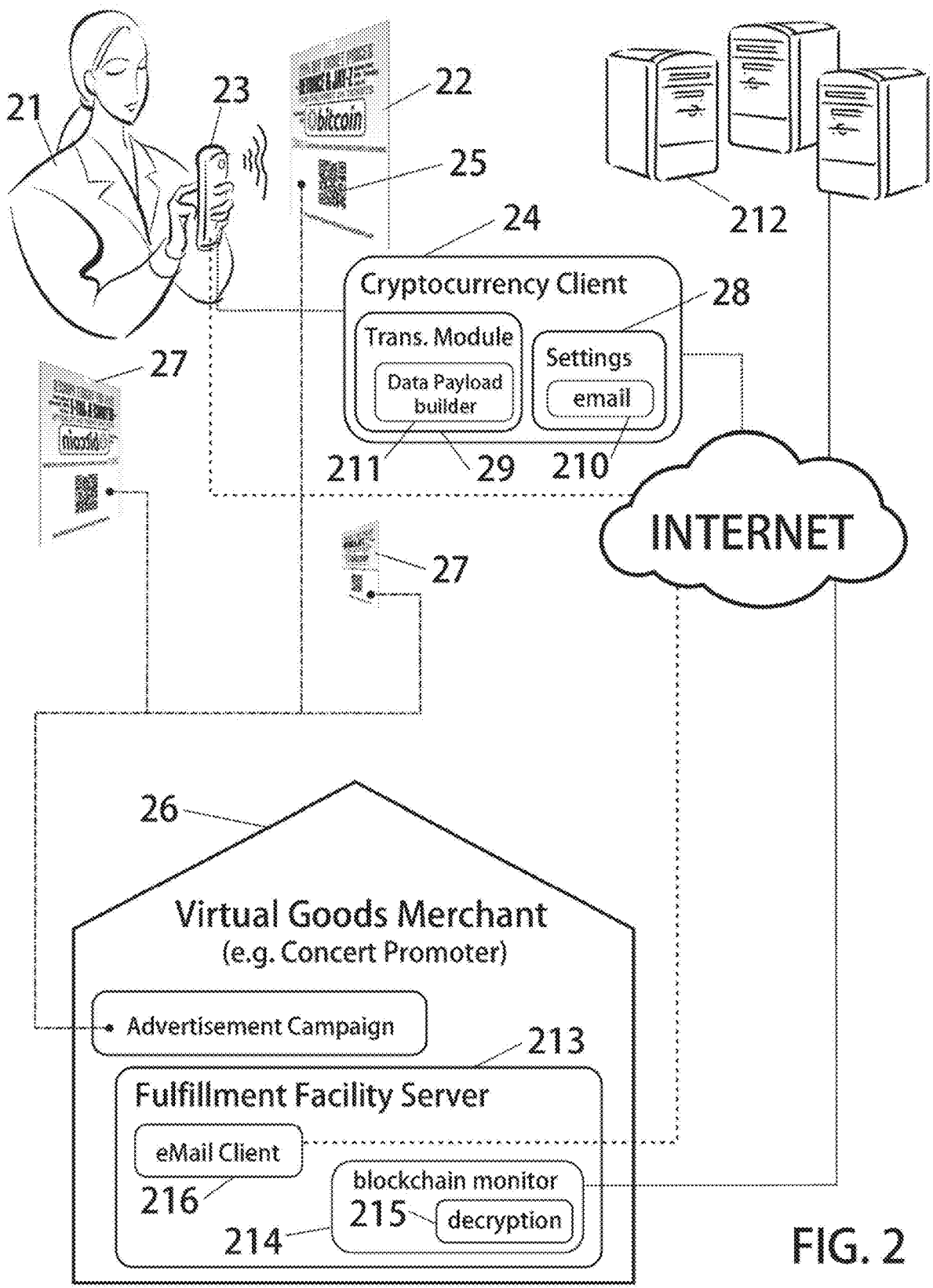
FIG. 2 is a block diagram illustration of primary system components and the relationships between these components.
Figure 3:
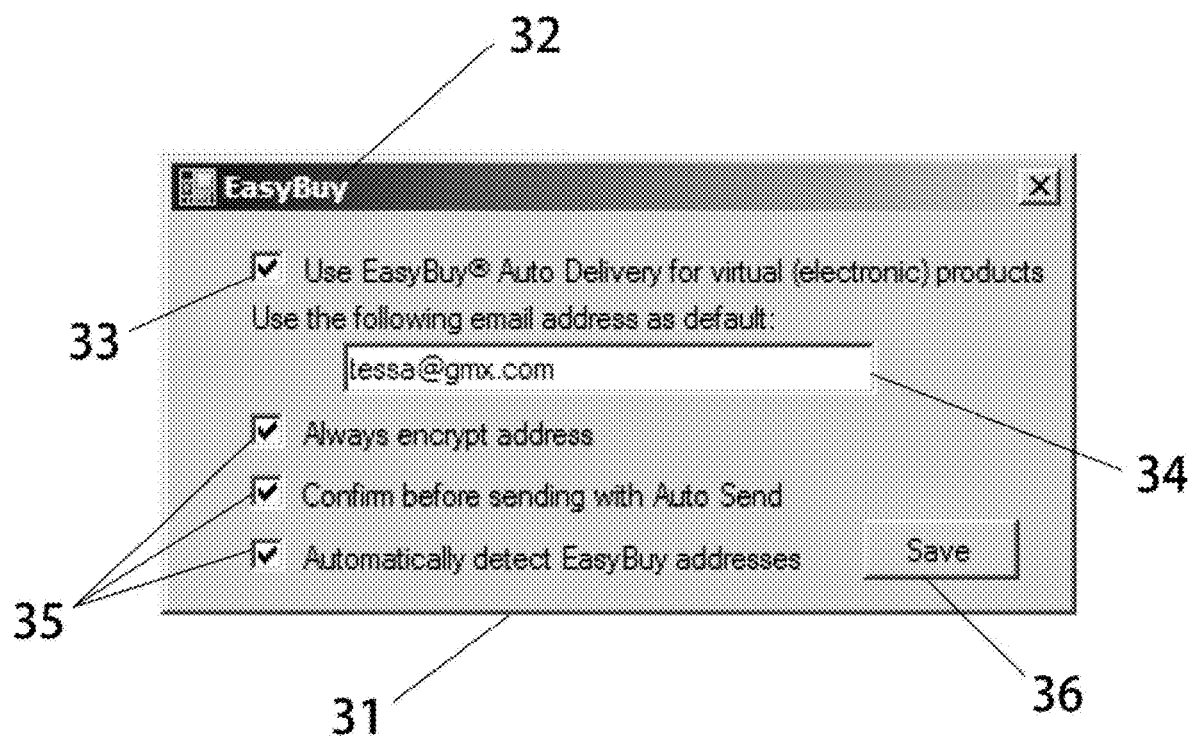
FIG. 3 is an example user interface of a cryptocurrency client app having settings thereon to control the operational modes of these systems.

In accordance with each of preferred embodiments of these inventions, cryptocurrency based commerce systems having transactions with delivery specification integrated therewith are provided. It will be appreciated that each of the embodiments described include an apparatus and that the apparatus of one preferred embodiment may be different than the apparatus of another embodiment. Accordingly, limitations read in one example should not be carried forward and implicitly assumed to be part of an alternative example.

These systems are primarily characterized as cryptocurrency-based commerce systems having transactions with integrated delivery specifications therein. These systems include apparatus, method, and articles of manufacture fashioned as carrier wave signals.

Apparatus of these inventions include subsystems which stand alone and these same subsystems in further view of their relationships with other coupled subsystems. For example one important apparatus is characterized as a cryptocurrency client application running on a general purpose logic processor. This cryptocurrency client application including a memory or data store arranged as a user profile registry. This user profile registry supports recording of a user's preferred email address and other delivery related performance options. Once initialized, the cryptocurrency client application operates in various modes in conformance with the user selections as defined by the registry. Specifically, the cryptocurrency client may form Bitcoin (or other cryptocurrency) transactions in which a special encoding is integrated with the transaction. Namely, a consumer email address is included whereby a merchant can recover this and use it to electronically transmit purchased goods and/or services.

Other subsystems are also to be considered apparatus of these inventions. For example, a merchant fulfillment module is coupled to a Bitcoin blockchain whereby it can monitor, parse, and decrypt transactions which are integrated with a current state of the blockchain from time-to-time. Upon detection of prescribed transactions having an electronic delivery address therein, these fulfillment modules respond by transmitting via the Internet and an email protocol purchased goods and/or services in an electronic form. Accordingly, these inventions include automated fulfillment means arranged to be responsive to cryptocurrency transactions as they are added to the blockchain by a peer-to-peer network.

Additionally, the entire system which is comprised of these subsystems and others, when coupled together form an amalgam which in and of itself is a novel arrangement of elements and relationships which also constitutes a discrete apparatus. These apparatus are also part of these inventions.

Methods of these inventions include unique processes and procedures when executed bring about commercial activity or trade in the sense of a sale transaction; that is an exchange of goods and/or services for monetary value particularly including value expressed as cryptocurrency units.

Similarly with regard to apparatus described above, both subset methods and methods in cooperation with related methods are considered part of these inventions. Some of the sub methods taught herein standalone as new and not obvious and as such are entitled invention protection on their own. When combined with other related sub methods, they final discrete methods which similarly are to be considered included invention.

In particular, one important method includes conveying a cryptocurrency transaction to a peer-to-peer network whereby the transaction has integrated therewith delivery information such an email address. A pre-initiated Bitcoin client application used to purchase goods and services includes user profile information including for example are email address. Upon purchase, the Bitcoin client forms a Bitcoin transaction and includes the email address as delivery specification.

Forming such unique Bitcoin transaction having integrated email addresses therein are considered per se inventive methods.

Another sub method which stands on its own as inventive is related to activity taken up by a merchant fulfillment facility. Upon monitoring a blockchain and detection of a transaction therein whereby said transaction includes delivery information, the fulfillment facility responds by causing an electronic transmission of goods or services. The fulfillment facility is responsive to the Bitcoin blockchain and deliveries of goods and services by email to customers who pay with Bitcoin are made.

These methods when operating together shall be construed as included methods. Further, these included methods may be combined with additional steps which further defined and improve these methods.

These inventions also include articles of manufacture. Articles of manufacture for purposes of this disclosure include those of a particular nature characterized as carrier wave signals. A carrier wave signal is a physical embodiment of an electronic or electromagnetic signal having specific modulation thereon whereby said specific modulation gives rise to some unique form or function or both. As such, the carrier wave signals taught herein are unique and first described in this disclosure.

One embodiment of these inventions includes a carder wave signal fashioned as a cryptocurrency transaction having encoded therein an email address. In an illustrative example, a cryptocurrency transaction formed in conformance with the Bitcoin protocol may include, for example data payload specified in the 40 byte data field called 'OP_Return'.

These and other aspects of apparatus, method and articles of manufacture will become even better understood in view of the following descriptions which are primarily directed toward illustrative specific versions of these.

In one special illustrative version of these systems, a user having a prepared cryptocurrency client such as a Bitcoin client which runs on the Android operating system of mobile telephones includes a special settings register in which a user may record her personal email address. So prepared, the Bitcoin client can then be used to make purchases of goods and services which may be delivered electronically via email, for example concert tickets.

By way of an attractive concert advertisement of FIG. 1, a concert promotion 1 includes a cryptocurrency payment option integrated directly therewith. It is clearly indicated 2 that users may purchase concert tickets (with an appreciable discount) via a direct cryptocurrency or option. For users having a specially prepared Bitcoin Client such as an Easy® client 3, users are reminded by an instruction 4 that delivery of tickets will be automatic and instantly conveyed electronically via email. Users merely address the QR code 5 or otherwise enter a Bitcoin address 6 into the Bitcoin client. The user's Bitcoin client then forms a specially prepared Bitcoin transaction having encoded therein the user's email address.

So encoded, this Bitcoin transaction is thereafter conveyed to the blockchain by way of the peer-to-peer Bitcoin network. Because the concert promoter can closely monitor the Bitcoin blockchain in real time at a fulfillment facility, the promoter nearly instantly knows about the presence of a pending Bitcoin transaction as it arrives at the network processing nodes (miners).

Once the Bitcoin transaction receives sufficient confirmation, the concert promoter can directly and instantly transmit admission tickets to the user electronically by email.

It is no longer necessary for users to explicitly pass their email information to merchants (concert promoters). This is due to the fact that this step is automated in software by the Bitcoin client. Further, it is not necessary for the concert promoter to receive and process orders manually as payment verification and delivery may be easily done in a highly automated fulfillment facility.

As such, concertgoers may more easily purchase and receive concert tickets directly. Since there is no longer needed for the bank's approval of a debit card, and no longer fees associated with bank services, a concert promoter can enjoy improved margins on sales. Further, since ticket delivery may be made fully automated without human attention, fulfillment staffing may be minimized or eliminated entirely. Of course a concert promoter using such advertisements suggested in FIG. 1 must make efforts to avoid having fraudsters make Bitcoin address spoof attempts, there are ways to assure the genuineness of Bitcoin addresses used in such promotions.

In the scenario where several classes of tickets are available, a single advertisement may inch de several QR codes, one each for each class of tickets. Because the payments arrive on different addresses, it is trivial for the fulfilment center to send the correct ticket class to customers who select which corresponding OR code to send a Bitcoin payment to.

While the OR code in the figure represents only Bitcoin addresses, it is known in the art to also include an encoding of the price along with the Bitcoin address. Certain Bitcoin clients will parse these types of encodings to populate the associated fields and further direct formation of a bitcoin transaction and present a user with a single 'approval' confirmation button.

In the event that a customer is using a Bitcoin client not in conformance with the automated return delivery feature described herein, the purchase process is complicated by further steps which must be taken between the merchant and consumer to convey alternative delivery provisions such as use of a will call type drop-off center.

Customers using the instant delivery feature will enjoy almost immediate delivery once Bitcoin transaction achieves a sufficient level of confirmation on the blockchain.

In one important poster promotional scenario, an interested concertgoer 21 sees a printed concert advertisement 22 for a performance event, a Beyoncé & Jay-Z concert, and takes a decision to purchase tickets to attend. To acquire an admission ticket, the system user deploys a mobile telephone computing platform 23 having thereon a Linux based type operating systems such as Google Android® which hosts execution of application-specific software or 'apps'. In one version, a mobile telephone is equipped with (installed) a cryptocurrency type app for example a cryptocurrency client 24.

Via Optical interrogation, for example imaging of a QR code 25, a user captures cryptocurrency address information and optionally price information provided by a virtual goods merchant 26 as part of a spatially distributed advertising campaign 27. Advertiser or other virtual goods merchant cryptocurrency address information is received by the cryptocurrency app, for example Bitcoin client.

A Bitcoin client of these systems is distinct from those typically known in the art and in wide distribution in that these systems include a special registry 28 and transaction forming module 29. The cryptocurrency client registry is arranged to receive from users in an initialization step and store therein, a preferred email address specification 210, the email address being one on which the user desires to receive virtual goods purchased with the Bitcoin cryptocurrency client.

A special settings registry is arranged to permit users to set up user profiles where personal information may be stored and recalled for use in certain related functions.

The transaction forming module is quite distinct from those modules used to form Bitcoin transactions in common Bitcoin clients in that this transaction forming module is specifically arranged with a data payload builder 211 to form Bitcoin transactions which are, well-formed, processable, and in full compliance with the Bitcoin protocol, but additionally have encoded therein as a data payload a consumer email address. This email address encoding may be arranged as simple plain text, obfuscated text, or encrypted data.

There are several parts of the Bitcoin transaction which may support inclusion of an email address specification. In one first Scheme, a Bitcoin transaction may be arranged with a plurality of outputs. It is possible to fashion one output address as a dummy address or 'fake' address to carry information which decodes to an email address. A very small value of Bitcoin sent to this fake address serves to put the email information in the blockchain record (see Master Protocol for additional details of this technique). A minor bit of engineering and cooperation at the merchant's fulfillment center's blockchain monitor allows this information to be easily recovered in whole.

While that technique is effective, some purists consider it poisonous to the blockchain as it tends to leave a kind of residue of unspent outputs in a portion of the system called the UTXO, As such, this technique is generally to be avoided albeit remains a functional approach.

Another way to include data in a Bitcoin transaction without creating unspent outputs relies upon a recent Bitcoin protocol improvement which introduces a data payload field. The 'OP_Return' field permits 40 bytes of user-specified data which can be entered as part of a Bitcoin transaction. In this field, a Bitcoin client of these inventions can insert a user email address (either encrypted or plaintext). Merchants finding email addresses in these transactions can be assured that they are true and accurate as coming only from the person signing the transaction (possessor of the private key). As such, merchants can be comfortable sending valuable merchandise to these addresses without fear of 'man-in-the-middle' schemes for intercepting goods and services. Still further, another approach for encoding a user email along with a Bitcoin transaction relates to a Bitcoin transaction having a 'multisig' construction. A multisig encoding is another way of getting data into a Bitcoin transaction without polluting the UTXO. A conversion between email address and a 'false signature' of a multistate transaction permits Bitcoin clients to integrate email addresses with conventional Bitcoin transactions in conformance with the Bitcoin protocol as it exists presently.

After a Bitcoin transaction is formed with a data payload which carries a customer's email address is properly formed and signed at the bitcoin client, it is transmitted to the Bitcoin peer-to-peer network 212 where it is processed to be included in the blockchain.

The merchant operates a special fulfillment facility which may include a server 213 which is coupled to the peer-to-peer network to monitor the blockchain and activity in the network, in particular, a blockchain monitor 214 is arranged to watch the blockchain and all transactions pending to be added to the blockchain A decryption module 215 may also be included to parse transactions thus yielding email addresses found in the transactions. Finally, an email server 216 is arranged to direct goods and services in electronic form to customer email addresses recovered from the network in the bitcoin transactions.

In one example version of a cryptocurrency client (e.g. mobile phone app) its conformance with these teachings, Operational modes of the system are controlled via a graphical user interface 31 used to set values in a settings register. The illustrative user interface shown is directed primarily to setting parameters of an EasyBuy™ branded 32 application, a special Bitcoin client of these teachings. The user interface permits users to make a binary selection via a checkbox type control object 33 which causes the cryptocurrency client to enter a mode in which for at least some Bitcoin (or other cryptocurrency) transactions include encoded therewith an email address specified by a user sometimes by way of a local register or memory arranged to hold same. In one example, a user may specify a preferred email address by text entry at a textbox type object 34. The email address "tessa@gmx.com" is entered and saved to a local register. Whenever the Bitcoin client forms a Bitcoin transaction, this email address may be recalled from the register and encrypted or otherwise encoded along with the Bitcoin transaction. Therefore an important necessary step in using the systems includes a user specifying an email address to be used in conjunction with future Bitcoin payments. In common uses of Bitcoin clients, users do not specify any email address and email addresses are not integrated into Bitcoin transactions which are passed into the peer-to-peer network. This distinction is striking. Additional functionality of these systems may similarly be controlled via user interface objects 35. Finally, in another action a user may save selections to a local memory which controls the application both by dismissing the user interface with the 'save' command button 36.

Figure 4:
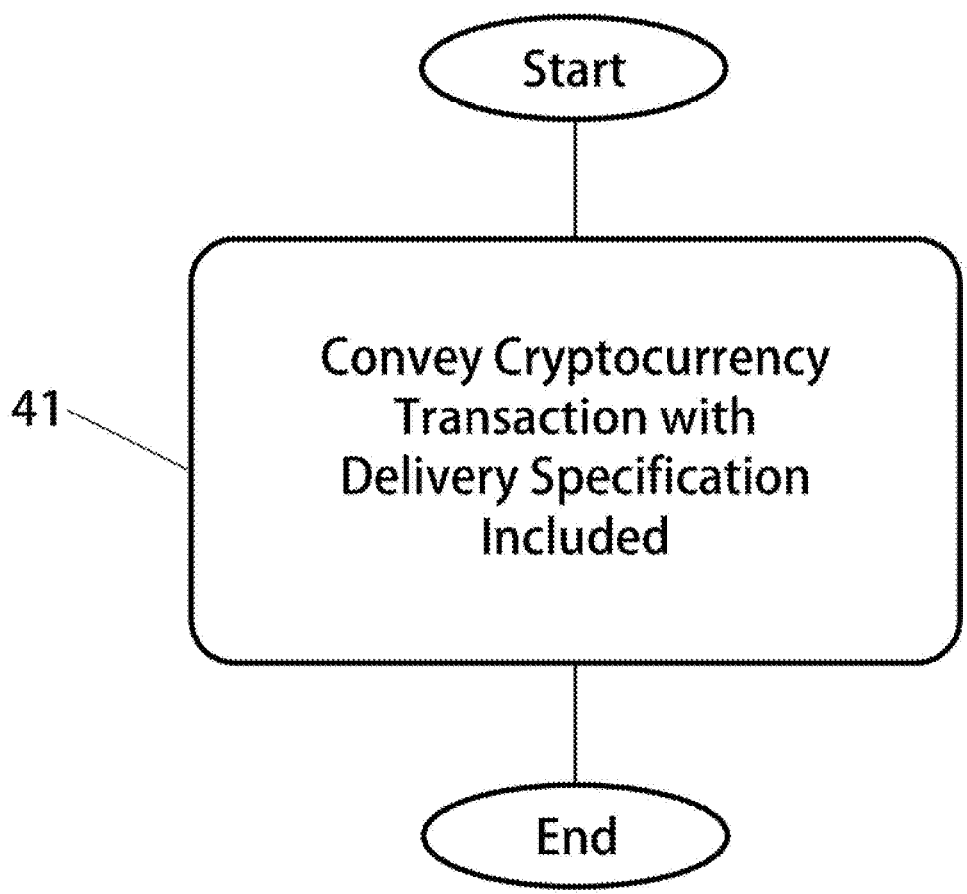
FIGS. 4 and 5 illustrate in a block scheme the primary methods of these cryptocurrency based commerce systems.

With reference to FIG. 4, one will appreciate a fundamental step 41 of generic versions of these system methods. Methods of executing commercial transactions whereby both payment and delivery address are encoded together in a single cryptocurrency transaction are claimed. That is, a Bitcoin transaction is formed into parts with a payment specification and a delivery specification (email address) and that transaction is conveyed to a peer-to-peer network for processing. Accordingly, methods which include the step of conveying to a peer-to-peer cryptocurrency network transactions which specify both payment and delivery integrated together are first proposed and described in detail herein. As such, these methods are considered novel and inventive and are claimed herein as such.

Figure 5:
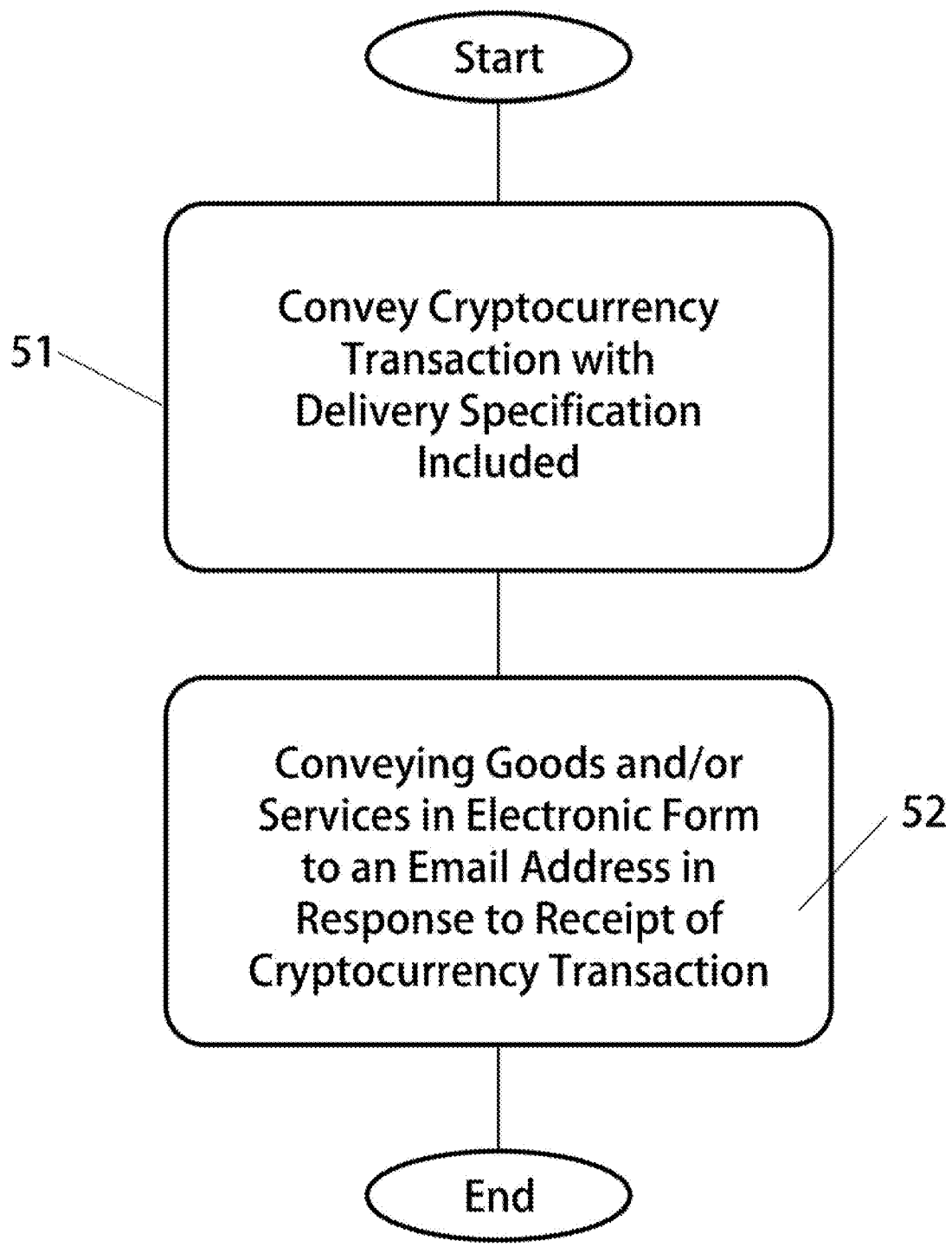

Further detailed methods of these systems will be more fully appreciated in view of the drawing of FIG. 5 which illustrates two primary steps of these e-commerce techniques. In a first step 51, a cryptocurrency transaction which has integrated therewith a delivery or email address is conveyed into a peer-to-peer cryptocurrency network for processing into the blockchain or public ledger. In a second step 52, a merchant or retailer responds to the first step by conveying goods or services to the purchaser electronically via the specified email address. In general, a merchant 'sees' the transaction by way of a blockchain monitor and when it is detected, confirmed and decrypted a merchant may respond, thereto by causing an electronic transmission conveyance addressed to an email address found in the Bitcoin transaction.

In some versions, an email specification may be simply transmitted with a common Bitcoin transaction in clear text. However, as this can expose an email address to undesirable abuses, it is preferable in certain embodiments to encrypt the email address prior to incorporating it with a Bitcoin transaction. In such a versions a Bitcoin client includes an encryption module for this purpose, Additionally, both the Bitcoin client and the merchant's server must include a cooperative encryption scheme whereby email addresses encrypted by a Bitcoin client can be decrypted by authorized merchants. These may be effected by various common encryption techniques suitable for light duty, encryption requirements.

Once a merchant's server detects arrival and confirmation of a so coded Bitcoin transaction on their blockchain, the server must provide goods and services in an electronic form which may be transmitted via communication systems and networks such as the Internet and more importantly over and email protocols such as SMTP, POP3, or IMAP, or others.

The particular types of goods and services which may be conveyed in this fashion include for example performance event admission coupons or 'tickets'. A so-called 'electronic ticket' is any conveyance which operates to indicate an authorization for admission or participation. In some versions, a mobile telephone receives a "ticket" as a barcode image which may be scanned at a turnstile for example. In this way, a concertgoer may send a single Bitcoin transaction directly from her Bitcoin client (initialized with a default email address) and receive by return email a response which includes means to pass the turnstile at the event venue.

Of particular interest, this may all occur in a very short time without any human participation.

While concert tickets are a very important illustrative example, the reader should appreciate that other goods and services are equally important in systems taught here. For example electronic delivery of music and vi deb media are also possible by systems described where a single Bitcoin payment automatically triggers receipt of such digital media via email or other Internet message transmission. In some alternative versions, a link to said media may be sent to an email client, stimulation of the link invokes any necessary player operable for consuming music or video content on a purchaser's local machine. For purposes of this disclosure, it will be considered as delivery of goods and services when such links are used in this regard.

Other goods and services characterized as video games, software, hooks, electronic books, manuscripts, text encodings, live broadcast media, passwords, among others may similarly be presented as purchased goods and services to be delivered to an email address or delivered via hyperlink transmitted to an email address when the hyperlink instantiates an appropriate player/device on a local machine, whereby said player/device is arranged to consume media in a special format not amenable to consumption by conventional email client platforms.

Throughout this disclosure the term 'email address' or email address specification is sometimes used. While electronic message addressing comes in various forms, it is to be understood that best anticipated uses of these systems are in conjunction with common email addresses in conformance with the standard definitions set forth in RFC 822. While other address schemes for electronic messaging are considered included, most of this disclosure has been directed to email addresses in common use in the form: [name]@[domain].[tld]

Bitcoin clients that these systems deploy are sometimes arranged to distinguish between common Bitcoin payments which do not require conveyance of any delivery email address and those which are part of an automated delivery scheme in which goods and/or services are immediately and automatically conveyed to users via a provided email address. There are several mechanisms by which this function may be achieved and each of these enables versions of these systems with various advantage in performance and overhead costs. Each may serve one type of deployment better than others. All are considered lesser included specie versions of the greater general system.

In a first most simple scheme these Bitcoin clients are arranged as a 'dumb' client and do not attempt to distinguish which Bitcoin transaction should include an email address and which will not. But rather, an email address is included with all Bitcoin transactions formed by these clients. For transactions going to merchants not equipped with an automated delivery feature, it is okay to merely ignore the email data of the Bitcoin transaction and provide for an alternative delivery method.

In another simple scheme, a program administrator selects a plurality of addresses as designated addresses which may be stored to a publicly available API or database query. Bitcoin clients attempting a Bitcoin payment transaction may first inquire if the payment address is on the list of designated addresses. In the event that the address is included in the list, an email address is integrated with a Bitcoin transaction. In the event that the address is not on the list then the buyers email address is omitted from the Bitcoin transaction. This technique requires maintenance of a registry of addresses and additionally the query step to determine whether an address is a designated included address or not. As such it has its disadvantages.

In another alternative scheme, specially devised the Bitcoin addresses are formed whereby they include therein special key strings which indicate to Bitcoin clients that the address belongs to an automated delivery system a customer email address is to be included within any Bitcoin transaction having that address as an output.

For example, the following 3 Bitcoin addresses include the particular pattern '1Easy' as an address prefix or lead string. A Bitcoin client can be configured to perform Bitcoin transactions to all addresses and to those addresses having '1Easy' at the beginning to include an email address as part of the Bitcoin transaction, Overtly Marked Bitcoin Addresses:
 Address 1: 1Easy27dZSiZaRy9bnYYCudgexfkQKPL4Z
 Address 2: 1EasyQQe5WJxyFiBAz7F4s2AXkusn1efP6
 Address 3: 1EasygagYyUAyD5Uze2PcccTsdwYG9pTV7

Sometimes it is preferable to obfuscate the signal or indicator within the address hut nevertheless included as a trigger to cause a Bitcoin client to encode its email address with transactions to that address. For example, the following three Bitcoin addresses appear to be entirely random in nature. However the pattern 'X [d] B [d] T' where [d] is any numeral appears in each albeit dispersed about the other characters randomly.

Covertly Marked Bitcoin Addresses:
 Address 1: 1LX3B4TfwYjioPagN8rektGKfen36bhw8A
 Address 2: 1tytnr3XDnZpbRX3B3TmS9apGH4sLjfDm
 Address 3: 13Cj8QQS5zAtZ5qXTDX8B9Th8BDGdryHAT A parser module of the Bitcoin client can be used to examine Bitcoin addresses prior to transaction transmission. In the event that the pattern is found within the address, and email address is included in the Bitcoin transaction. In the event the pattern is not found, a normal Bitcoin transaction is constructed without inclusion of any email address.

Of course other schemes are easy to devise to assure merchants operating an automated electronic delivery feature cap receive customer email addresses directly by Bitcoin transaction encodings. These are too numerous to list here, but it will be understood that alternative schemes exist to provide this function.

Email Address Encryption

Because most users of email systems take great efforts to avoid careless distribution of their email addresses, some versions of the systems include means by which email addresses are included with a Bitcoin transaction in an obfuscated or encoded and/or encrypted form. Clear text or plain text email addresses could be readily captured from the blockchain and subject to abuse such as conversion to spam targets. As such when a Bitcoin payment is made to a prescribed Bitcoin address where the sender's email is to be included therein, the email address may be first operated upon to conceal it from unauthorized users.

In one first version, the email address may be encrypted as cryptographic message where the Bitcoin address is the public key used to encode a message so encrypted. Only the holder of the corresponding private key is able to reveal the message. Since the Bitcoin payment transaction receiver surely has the corresponding private key, email addresses sent this way can be readily decrypted by authorized parties receiving them.

Since one preferred embodiment of these systems include one in which a Bitcoin transaction carries an email address via a special payload provision known as "OP_Return" in the Bitcoin protocol, the entire encoded email address must be 40 bytes or fewer. In systems where limited data payload size restricts available encryption, alternative means of concealing email addresses are provided. Many 'lightweight' encryption schemes are possible whereby an email address may be concealed or obfuscated and still remain small in size. For strategies which adopt bandwidth limit data payloads, these lightweight encryption schemes are preferred.

While email is a most important electronic messaging platform and the primary example developed here throughout, there exists other very important electronic messaging platforms which enable still further important functionality not achievable by Internet/email.

In the one of most important first example of such electronic messaging system, 'text', 'SMS' or 'MMS', messaging systems are well suited for carrying short or brief messages over mobile telephone networks. 'Text' or 'SMS' are particularly suited for very short text only messages. Conversely MMS messaging systems are aligned to carry various content types and typically are suitable for handling somewhat higher bandwidth albeit still very brief in comparison to data heavy applications more typical of TCP/IP message and file exchanges.

'Text', 'SMS' Or 'MM S' messaging systems are quite distinct from email and electronic messaging in that the addressing schemes and message routing are very different. 'Text', 'SMS' or 'VMS' type messages are directed to their recipients by way of a telephone number. A telephone number is all that is needed to direct a text message or example. Specification of a telephone number in a text messaging system dictates the final destination of any message can be routed therein Accordingly, systems described herein also work very well with these alternative electronic messaging systems which are not based upon email but are based upon the SMS and MMS messaging systems built upon a mobile telephone communications networks.

In consideration of these alternative electronic messaging systems, the following examples are developed. In these examples, Bitcoin payment may be made wherein he Bitcoin (or other cryptocurrency) transaction includes a mobile telephone number on which a customer would like to receive an SMS or MMS response. In a fashion similar to that described previously, a mobile telephone number may be included as a data payload in a conventional Bitcoin transaction, for example by way of 'OP_Return' data payload (or other encoding scheme)) and receipt of such Bitcoin transactions can be used to stimulate receiving servers into sending automated responses by SMS or MMS to the destination telephone number.

In an important illustrative example, the Bitcoin cli ent running as an app on a mobile telephone operates to form and transmit transactions into the peer-to-peer cryptocurrency networks. The app hawing access to the mobile telephones number is operable for including this number specification within the Bitcoin transaction.

An important distinction should be appreciated regarding the notion 'the app having access'. In previous descriptions, a user profile is maintained to hold a use's email address. However, in the instant version it is not necessary that a Bitcoin client includes such user profile. Apps running on a mobile phone generally have ready access to parameters associated with specific phone on which they are running— for example the mobile telephone number. Accordingly, without a user profile, and have arranged as Bitcoin client can still send as part of a Bitcoin transaction the telephone number which can thereafter be used by the server to return electronic messages by SMS Or MMS.

By further extensions of the example used presented previously, a mobile phone user may wish to purchase concert admission via a Bitcoin payment. To gain admission to the show, the server receiving sent Bitcoin payment must transmit a response to the concert going customer whereby the response operates to allow the customer to gain admission to the show.

This may be accomplished as follows. With a properly equipped Bitcoin client suitably arranged to form special Bitcoin transactions with a user telephone number (return SMS, MMS message address) integrated as a data payload within the Bitcoin transaction, a user buys concert admission by sending a prescribed amount of Bitcoin currency to a prescribed Bitcoin address associated with the concert promoter.

A blockchain monitor detects receipt of the Bitcoin payment and response by recovering from the Bitcoin transaction to payers telephone number. The server then prepares an SMS or MMS response to be directed by of those messaging platforms wherein the response includes means for admission to the show. For example, a text message with an image attachment may include a barcode or other optical encoding which may be presented at a turnstile scanner for admission.

Since the server is arranged to take special procedures with transactions received on particular addresses, it knows to look for telephone numbers encoded within these Bitcoin transactions. Upon resolving the telephone number received in a Bitcoin transaction, the server can direct a response to the person sending the payment by way of an electronic message fashioned as SMS or MMS.

The sophisticated reader will fully appreciate that sending a barcode to enable admission is a particular embodiment well-suited for turnstile operations. However, these inventions should not be deemed limited to SMS or MMS responses having barcoded. It is entirely possible to fashion responses with passwords, pins, codes, et cetera. Each of these response types may operate in conjunction with coupled systems to bring about particular advantage associated with those data types. Without deviation from the essence of these inventions which lies in the notion that response electronic messages may be provided on various messaging platforms where the message destination address arrives at a server as a specification integrated in a Bitcoin transaction.

One will now fully appreciate how cryptocurrency based commerce systems having automated electronic delivery means and provision integrated therewith. Although the present invention has been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. A method of effecting a purchase order, comprising:
scanning a quick response (QR) code;
extracting, from the scan of the QR code, a Bitcoin address and an encoding key;
encoding an address with an encoded prefix in a cryptocurrency transaction, wherein the encoded prefix indicates that the address is associated with a service that conveys goods or services embodied in an electronic form to an email address encoded in the cryptocurrency transaction;
conveying the cryptocurrency transaction to a peer-to-peer network, wherein the email address is encoded in one or more of an OP_Return type data payload of a transaction formatted according to a Bitcoin protocol or a multisig field of the cryptocurrency transaction, wherein conveying the cryptocurrency transaction to the peer-to-peer network is based on the Bitcoin address and the encoding key;
based on conveying the cryptocurrency transaction to the peer-to-peer network, conveying goods or services embodied in the electronic form to the email address encoded in the cryptocurrency transaction;
monitoring a cryptocurrency blockchain; and
taking one or more actions based on detecting prescribed activity while monitoring the cryptocurrency blockchain after the cryptocurrency transaction is conveyed to the peer-to-peer network.

2. The method of claim 1, wherein conveying the goods or services comprises transmitting the goods or services in one or more email communications transmitted over the Internet.

3. The method of claim 1, wherein the goods or services comprise event admission tickets, music recordings, video, text, game content, live event broadcast, software, encryption keys or passwords.

4. The method of claim 1, wherein the email address is encoded in the cryptocurrency transaction as an output address of the cryptocurrency transaction.

5. The method of claim 1, further comprising: setting a user email specification field in a register of a user profile to the email address.

6. The method of claim 1, further comprising encoding the email address in the cryptocurrency transaction based on an encryption scheme in which a cryptocurrency address is used as an encryption key.

7. The method of claim 1, further comprising encoding an address with an explicit prefix in the cryptocurrency transaction, wherein the explicit prefix indicates that the address is associated with a service that conveys goods or services embodied in the electronic form to the email address encoded in the cryptocurrency transaction.

8. The method of claim 1, wherein the taking one or more actions comprises generating a hyperlink which instantiates a player on a receiving device to consume the goods or services embodied in the electronic form.

9. The method of claim 1, wherein detecting proscribed activity comprises detecting that a telephone number is encoded within the cryptocurrency transaction.

10. The method of claim 9, wherein the taking one or more actions comprises conveying the goods or services embodied in the electronic form via an electronic message to the telephone number encoded within the cryptocurrency transaction.

11. An apparatus, comprising:
a memory having executable instructions stored thereon; and
a processor configured to execute the executable instructions to cause the apparatus to:
scan a quick response (QR) code;
extract, from the scan of the QR code, a Bitcoin address and an encoding key;
encode an address with an encoded prefix in a cryptocurrency transaction, wherein the encoded prefix indicates that the address is associated with a service that conveys goods or services embodied in an electronic form to an email address encoded in the cryptocurrency transaction;
convey the cryptocurrency transaction to a peer-to-peer network based on the Bitcoin address and the encoding key, wherein the email address is encoded in one or more of an OP_Return type data payload of a transaction formatted according to a Bitcoin protocol or a multisig field of the cryptocurrency transaction; and
based on conveying the cryptocurrency transaction to the peer-to-peer network, conveying goods or services embodied in the electronic from at the email address encoded in the cryptocurrency transaction;
monitor a cryptocurrency blockchain; and
take one or more actions based on detecting prescribed activity while monitoring the cryptocurrency blockchain after the cryptocurrency transaction is conveyed to the peer-to.peer network.

12. The apparatus of claim 11, wherein the cryptocurrency transaction comprises a transaction formed in accordance with a Bitcoin protocol.

13. The apparatus of claim 11, wherein in order to convey the goods or services, the processor is further configured to cause the apparatus to transmit the goods or services in one or more email communications transmitted over the Internet.

14. The apparatus of claim 11, wherein the email address is encoded in the cryptocurrency transaction as an output address of the cryptocurrency transaction.

15. The apparatus of claim 11, wherein the processor is further configured to cause the apparatus to set a user email specification field in a register of a user profile to the email address.

16. The apparatus of claim 11, wherein in order to take the one or more actions, the processor is configured to cause the apparatus to generate a hyperlink which instantiates a player on a receiving device to consume the goods or services embodied in the electronic form.

17. The apparatus of claim 11, wherein in order to detect proscribed activity, the processor is configured to cause the apparatus to detect that a telephone number is encoded within the cryptocurrency transaction.

18. The apparatus of claim 17, wherein in order to take the one or more actions, the processor is configured to convey the goods or services embodied in the electronic form via an electronic message to the telephone number encoded within the cryptocurrency transaction.

19. An apparatus, comprising:
- means for scanning a quick response (QR) code;
- means for extracting, from the scan of the QR code, a Bitcoin address and an encoding key;
- means for encoding an address with an encoded prefix in a cryptocurrency transaction, wherein the encoded prefix indicates that the address is associated with a service that conveys goods or services embodied in an electronic form to an email address encoded in the cryptocurrency transaction;
- means for conveying the cryptocurrency transaction to a peer-to-peer network, wherein the email address is encoded in one or more of an OP_Return type data payload of a transaction formatted according to a Bitcoin protocol or a multisig field of the cryptocurrency transaction, wherein conveying the cryptocurrency transaction to the peer-to-peer network is based on the Bitcoin address and the encoding key;
- means for conveying, based on conveying the cryptocurrency transaction to the peer-to-peer network, goods or services embodied in the electronic form to the email address encoded in the cryptocurrency transaction;
- means for monitoring a cryptocurrency blockchain; and
- means for taking one or more actions based on detecting prescribed activity while monitoring the cryptocurrency blockchain after the cryptocurrency transaction is conveyed to the peer-to-peer network.

20. The apparatus of claim 19, wherein the means for taking one or more actions comprises means for generating a hyperlink which instantiates a player on a receiving device to consume the goods or services embodied in the electronic form.

\* \* \* \* \*